United States Patent
Peters

[15] 3,673,107
[45] June 27, 1972

[54] MIXED FIELD RADIATION DOSIMETER MATERIALS OF AMINE SALTS OF ORGANIC ACIDS

[72] Inventor: Ignatius G. Peters, Devine, Tex.

[73] Assignee: The United States of America as represented by the Secretary of the Air Force

[22] Filed: Dec. 18, 1969

[21] Appl. No.: 886,373

[52] U.S. Cl. ..........................252/408, 23/230 R, 250/41.9, 324/0.5 R
[51] Int. Cl....................................G01n 27/78, G01n 31/22
[58] Field of Search.....................252/408; 324/0.5 R, 0.5 A; 23/230 R, 230 B, 253 R; 250/41.9; 424/1, 9

[56] References Cited

UNITED STATES PATENTS 3,141,898  7/1964  Van Dyke Tiers.....................324/0.5

*Primary Examiner*—John T. Goolkasian
*Assistant Examiner*—M. E. McCamish
*Attorney*—Harry A. Herbert, Jr. and Cedric H. Kuhn

[57] ABSTRACT

Amine salts of organic acids are used as dosimeter materials. The salts react with mixed field ionizing radiation to form stable free radicals which may be detected by the technique of electron spin resonance spectroscopy. The salts have hydrogen contents of from about 9 to about 11 weight percent and thus react with ionizing radiation in a manner similar to human tissue which has about 10 weight percent hydrogen. The materials are useful in studying the effect of radiation on tissue.

2 Claims, No Drawings

MIXED FIELD RADIATION DOSIMETER MATERIALS OF AMINE SALTS OF ORGANIC ACIDS

BACKGROUND OF THE INVENTION

1. Field of the Invention

This invention is in the field of tissue equivalent dosimeter materials.

2. Description of the Prior Art

It is well known that when human tissue is subjected to mixed field ionizing radiation including such types of radiation as gamma rays, X-rays, electrons, protons, and neutrons, free radicals are formed in the tissue which eventually cause the death of the tissue. The free radicals are formed when ionizing radiation having sufficient energy removes hydrogen from molecules in the tissue.

It has been recognized that, in order to study the effects of ionizing radiation on tissue, a chemical compound that can be substituted for tissue and which will react in a similar manner with radiation is desirable. In order to be used as a substitute for tissue, a dosimeter material should have three properties. Firstly, free radicals must be formed in the material by ionizing radiation. Secondly, the free radicals must be stable long enough to be detected by electron spin resonance spectroscopy or some other means. Thirdly, the material should have the same chemical elements as tissue and should preferably have in the neighborhood of about 10 weight percent hydrogen.

Many chemical compounds, including most of the amino acids and sugars, have been tested as potential dosimeter materials. Two main problems which have prevented their use as dosimeter materials have been (1) instability of the free radicals formed within them by ionizing radiation and (2) improper hydrogen weight percentages. One compound that has been found to be useful and which has been widely used is d, 1-α-alanine. Alanine forms very stable free radicals when subjected to ionizing radiation. However, alanine has only about 7.9 weight percent hydrogen and does not react with tissue equivalency. More particularly, it has been found that neutrons do not cause as much free radical formation in alanine as they do in tissue.

SUMMARY OF THE INVENTION

It has now been unexpectedly found that certain amine salts of organic acids form free radicals when subjected to ionizing radiation and that the free radicals formed remain stable long enough to be detected by electron spin resonance spectroscopy. The compounds which are the subject of this invention have the general formula:

$$R''''R'''R''R'NO_2C-R-CO_2-NR'R''R'''R''''$$

wherein R is $(CH_2)_n$ and $n$ is in integer from 0 to 3, inclusive; and wherein R', R'', R''', and R'''' are selected from the group consisting of H and $CH_3$ with the combination of H and $CH_3$ groups being selected so that from about 9 to about 11 weight percent of compound is hydrogen.

DESCRIPTION OF THE PREFERRED EMBODIMENTS

Specific examples of dosimeter materials of this invention are:

| Compound | Wt. percent H |
|---|---|
| $(H_3C)_3HNO_2CCO_2NH(CH_3)_3$ | −9.62 wt. percent H. |
| $(H_3C)_4NO_2CCO_2N(CH_3)_4$ | −10.17 wt. percent H. |
| $(H_3C)_2H_2NO_2CCH_2CO_2NH_2(CH_3)_2$ | −9.28 wt. percent H. |
| $(H_3C)_3HNO_2CCH_2CO_2NH(CH_3)_3$ | −9.92 wt. percent H. |
| $(H_3C)_4NO_2CCH_2CO_2N(CH_3)_4$ | −10.4 wt. percent H. |
| $(H_3C)_2H_2NO_2CCH_2CH_2CO_2NH_2(CH_3)_2$ | −9.62 wt. percent H. |
| $(H_3C)_3HNO_2CCH_2CH_2CO_2NH(CH_3)_3$ | −10.18 wt. percent H. |
| $(H_3C)_4NO_2CCH_2CH_2CO_2NH(CH_3)_3$ | −10.61 wt. percent H. |
| $(H_3C)H_3NO_2CCH_2CH_2CH_2CO_2NH_3(CH_3)$ | −9.28 wt. percent H. |
| $(H_3C)_2H_2NO_2CCH_2CH_2CH_2CO_2NH_2(CH_3)_2$ | −9.92 wt. percent H. |
| $(H_3C)_3HNO_2CCH_2CH_2CH_2CO_2NH(CH_3)_3$ | −10.4 wt. percent H. |
| $(H_3C)_4NO_2CCH_2CH_2CH_2CO_2N(CH_3)_4$ | −10.78 wt. percent H. |

Also contemplated are mixed salts where the two NR'R''R'R'''' groups are different but where the weight percentage of hydrogen is between 9 and 11 percent.

The dosimeter materials of this invention may be prepared by neutralizing oxalic acid, malonic acid, succinic acid, or glutaric acid with a water solution of a suitable amine or with a suitable ammonium hydroxide under reduced pressure. Examples of suitable amines and hydroxides include methyl amine, dimethyl amine, trimethyl amine, and tetramethyl ammonium hydroxide. The reduced pressure is applied to remove water. Thus, the final product is a dry amine salt. The amine is selected to yield a final product having from 9 to 11 weight percent hydrogen.

Bis(tetramethylammonium)malonate may be used to specifically illustrate the invention. It may be prepared by the method of the following example.

EXAMPLE I

Bis(tetramethylammonium)malonate

Tetramethylammonium hydroxide pentahydrate and malonic acid in a 2 to 1 mol ratio were mixed in a suction flask. The suction flask and its contents were heated to a temperature of 100° C by an oil bath while reduced pressure was being applied to remove water formed by the reaction. Heating was continued until no more water was produced. The reaction product remaining in the flask was then further heated at 105° C to drive off any residual water until complete dryness was shown. This material was then pulverized and protected from moisture in a desiccator. The composition of the material was checked by determining the nitrogen content and by material balance determinations. The composition was:

$$(CH_3)_4NO_2CCH_2CO_2N(CH_3)_4.$$

EXAMPLE II

After preparation, a sample of bis(tetramethylammonium) malonate was subjected to a gamma ray does of 50 krads. A 5,000 curie Co-60 source was used to produce the gamma rays. The sample irradiated was placed in a plastic bottle at a distance from the gamma ray source such that a dose rate of 1 krad per minute was delivered. Comparison of the electron spin resonance spectrum of gamma ray irradiated bis(tetramethylammonium)malonate with that of d,1-α-alanine (commercially obtained and irradiated in the same manner) indicated that the bis(tetramethylammonium)malonate was 1.1 times as sensitive to gamma rays as the alanine. The comparisons were made by observing the maximum to minimum height of the differential electron spin resonance spectra of the two compounds. Electron spin resonance spectra were made with an Alpha spectrometer equipped with a circular cavity operating at 9.25 Gc and 3290 ±20 gauss.

EXAMPLE III

Exposure of bis(tetramethylammonium) malonate to 14 Mev neutrons obtained from a Texas Nuclear Neutron Generator bombarding tritium with 150 kev deuterons:

showed that the sensitivity of the bis(tetramethylammonium) malonate to neutrons was 1.03 times that of tissue.

Bis(tetramethylammonium)malonate has been used above as a means of conveniently illustrating the invention. Any other compound listed above could have been used in lieu thereof. The following general statements may be made with respect to all of the compounds listed above as dosimeter materials of this invention. (1) The compounds have hydrogen weight percentages between 9 and 11 and thus any given sample approximates a similar sized tissue sample in hydrogen content. (2) Free radicals are formed in samples of the compounds when the samples are subjected to gamma rays, neutrons, or mixed field irradiation. (3) The free radicals formed are stable long enough to be detected and measured by electron spin resonance spectroscopy. (4) The free radical content of irradiated samples may be protected indefinately by storage at −70° C and exclusion of $O_2$ and $H_2O$.

Dosimeters may be made utilizing the above specified compounds by encapsulating ground material in a hermetically sealed container.

I claim:

1. A dosimeter utilizing as the active dosimeter material a compound having the general formula:

$$R''''R'''R''R'NO_2C-R-CO_2NR'R''R'''R''''$$

where R is $(CH_2)_n$ with $n$ being an integer from 0 to 3, inclusive; and wherein R', R'', R''', and R'''' are selected from the group consisting of H and $CH_3$ with the combination of H and $CH_3$ groups being selected so that from about 9 to about 11 weight percent of the dosimeter material is hydrogen.

2. A dosimeter according to claim 1 wherein the material is bis(tetramethylammonium)malonate.

* * * * *